June 19, 1951  J. S. SMITH, JR  2,557,320
NUT, CLUTCH, AND EXPEL CONTROL
FOR MECHANICAL PENCILS
Filed Nov. 23, 1949
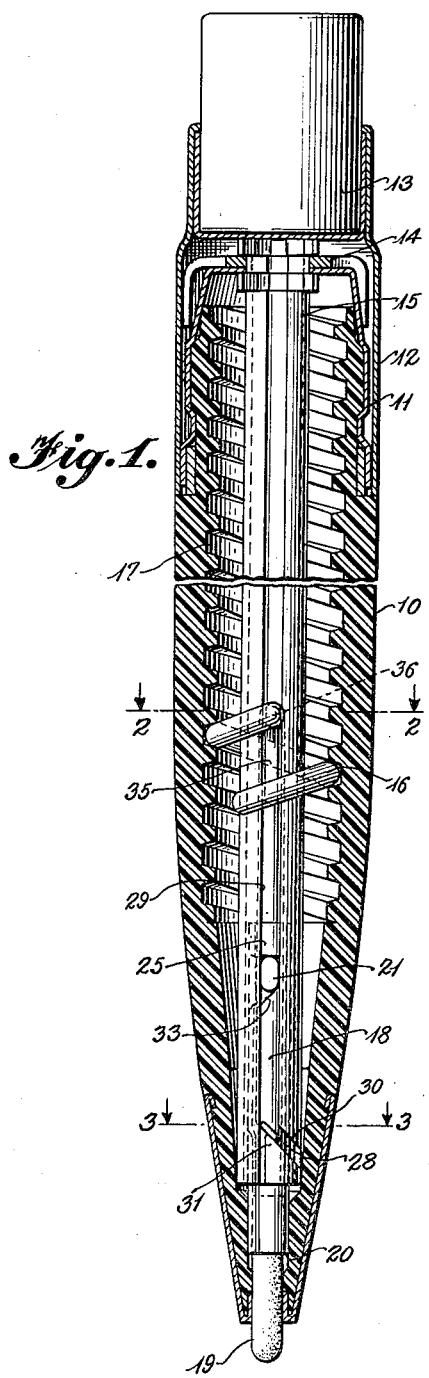
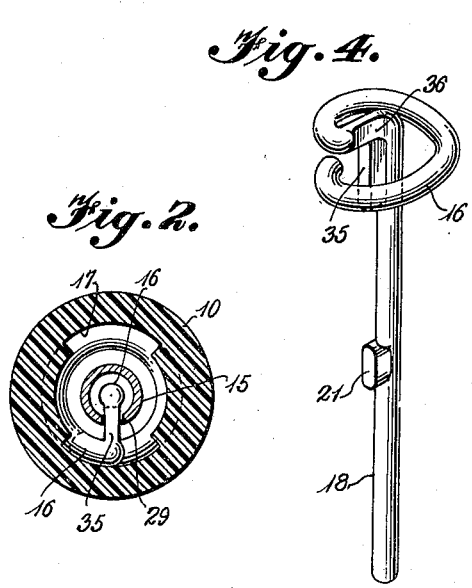
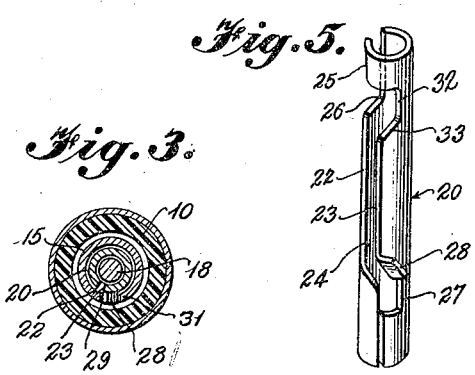
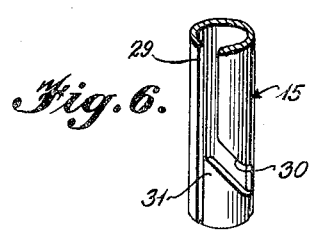
INVENTOR.
John Sherman Smith Jr.
BY
Jewett, Mead & Brown
ATTORNEYS Patented June 19, 1951

2,557,320

UNITED STATES PATENT OFFICE 2,557,320

NUT, CLUTCH, AND EXPEL CONTROL FOR MECHANICAL PENCILS

John Sherman Smith, Jr., Decatur, Ga., assignor to Scripto, Inc., Atlanta, Ga., a corporation of Georgia Application November 23, 1949, Serial No. 129,097

7 Claims. (Cl. 120—18)

The invention relates to mechanical pencils and has as an object the provision of improvements in the feed nut, in the clutch, and in the expel control elements.

It is an object of the invention to provide an improved form of nut which may be very cheaply made without sacrificing utility.

It is a further object to provide a form of clutch and expel elements for coaction with the feed nut of the invention.

Further objects will appear from the following description when read with the accompanying drawings showing an illustrative form of the invention and wherein:

Fig. 1 is a central longitudinal section of a pencil upon an enlarged scale, broken away to shorten the showing and showing the elements of the invention installed;

Figs. 2 and 3 are transverse sections on lines 2—2 and 3—3, respectively, of Fig. 1;

Fig. 4 is a perspective view of the nut of the invention;

Fig. 5 is a perspective view of the clutch; and

Fig. 6 is a detail perspective view of the lower portion of the split tube shown in Fig. 1.

As shown, the pencil embodies an internally screw threaded barrel 10, a fixed cap 11, a ferrule 12, an eraser 13, and a friction drive member 14 which parts are of the form and function disclosed in Patent No. 2,511,301 dated June 13, 1950.

Driven by the friction drive member 14 in the manner described in said prior application there is a split tube 15, the lower end of which is shown in Fig. 6.

To coact with the split tube 15, there is shown a nut 16 which in accordance with the invention is formed of a spiral rod to engage the internal screw threads 17 of the barrel, the upper portion of the spiral being turned inwardly, diametrically to pass radially to the interior of the split tube, then downwardly integral with the plunger rod 18 which contacts the upper end of the lead 19 to propel the same and eventually, at the lower end of the travel of the nut, to expel the lead, as will be described.

To coact with the clutch 20 the plunger rod 18 is shown as carrying a lug 21 desirably formed from the material of the rod by a stamping operation which distorts a portion of the rod outwardly as shown, the outward flow of the material of the rod leaving a depression 21 of no consequence.

As shown particularly in Fig. 5, the clutch 20 is formed of sheet material, preferably metal turned to tubular form, the edges 22, 23 being separated to provide a slot 24 for downward travel of the lug 21 in expelling action. The upper end of the edge 23 is formed with a projection 25 extending into a cut away recess 26 so as to substantially complete a tubular structure at the said upper end of the clutch, the projection 25 forming an upper closure of the slot 24.

The edge 23 of the clutch is also cut-away to form a recess 32 having an inclined lower margin 33, inclined for a purpose stated in the description of the operation.

Clutch 20 as shown is also formed with a recess 27 formed in the edge 23 of the sheet material, the material freed from the recess being turned outwardly to provide a projecting lug 28, which lug stands at an angle to the axis of the clutch.

As shown in Fig. 1, when the clutch is circumferentially so positioned that the lug 21 underlies the portion 25 of the clutch, the lug 28 is positioned in the slot 29 of the split tube 15.

To coact with lug 28 at the lowermost limit of its travel, the slot in the split tube 15, as best shown in Fig. 6, is formed with a diagonally extending recess 30, the material 31 of the tube at the lower margin of which recess extends to substantially close the slot 29 in the split tube.

As shown the nut 16 is formed with a plate 35 rigid at one edge with the rod 18 and secured at its opposite edge to a turn of the helix. This plate with the inwardly projecting portion 36 of the wire takes the thrust of the margins of the split tube slot thus reducing the pressure per unit area to further assure smooth action.

Operation

A pencil "lead," as 19, engaged by clutch 20 will abut the end of rod 18. In the position of the parts shown in Fig. 1 rotation of the split tube in a counterclockwise direction will cause the nut 16 to travel upwardly in the split tube thereby driving the lead backwardly into the pencil, by virtue of force applied to the portion 25 of the clutch by lug 21.

Clockwise rotation of the split tube will drive the lead forwardly by pressure of the lug 21 on the inclined lower edge of recess 32. The clutch 20 is not thus rotated by the inclination of the margin 33 of the recess 32 because during propel of the lead the lug 28 of the clutch is traveling in the slot 29 of the split tube.

When lug 28 strikes the portion 31 of the split tube which substantially closes the bottom of the slot 29, the clutch will be caused to rotate to bring the space between the edges 22, 23 into registry with slot 29 of the split tube whereupon continued movement of the rod 18 with the nut may take place independently of the clutch with the final result of expelling the lead stub from the tip of the pencil.

When the lug 28 strikes the upper margin of the recess 30 of the split tube, downward motion of the clutch ceases at substantially the position shown in Fig. 1. The force required to revolve the clutch to permit passage of lug 21 along the slot 24 of the clutch is derived from downward pressure of the lug 21 upon the inclined margin 33 of recess 32 and the application of this force to clutch 20 to cause its revolution is divided between the inclined margin 33 and the inclined lower margin of recess 30. During this portion of the operation the downward motion of the clutch is not resisted by contact with an obstacle in the path of its lower end, as in some former structures. A very smooth turning movement results.

When the rotation of the tube is in a counter-clockwise direction with clutch and rod 18 in full expelling position, lug 21 will rise in the slot 24 until it strikes the portion 25 of the clutch. Further movement will cause lug 28 to coact with the upper inclined margin of recess 30 to revolve the clutch whereby to allow lug 28 to travel upwardly in slot 29 in backward drive or so-called repel action, whereupon a new lead may be inserted into the clutch at any point in its further travel.

In some instances, former pencil structures have included a vacant space between the exterior of the split tube and the interior of the barrel, access of lead fragments to which space was possible through a recess formed in the edge of the slot of the split tube, formed for the purpose of the cam slot 30 of the present invention.

In the structure shown the split tube 15 fits quite closely in the barrel at the lower extremity of the tube and no significant space exists exteriorly of slot 30 for receipt of lead fragments if the lead is fractured in the expelling operation.

Minor changes may be made in the physical embodiment of the invention within the scope of the appended claims without departing from the spirit of the invention.

I claim:

1. In a mechanical pencil of the type including an internally screw-threaded barrel, a split-tube and means to cause relative rotation between the tube and barrel; the combination of a split-tube formed with a slot in the wall thereof substantially parallel with the axis of the tube; a nut, a lead propelling and expelling rod mounted to travel in said tube and driven by said nut; a lug projecting from said rod to travel in said tube slot; a clutch tube partially enclosing said rod and formed with a slot and a portion to overlie said lug; a lug projecting from a wall of said clutch tube adjacent the slot therein, to travel in said split-tube-slot with the slot of the clutch out of registry with the first named slot; and cam means carried by the split-tube partially obstructing the lower end of the slot thereof, acting on said clutch tube lug to revolve the clutch tube to bring the slot thereof into registry with the slot of the split tube for travel of said first named lug in both slots in lead expelling movement.

2. The structure of claim 1 with a second cam means carried by the split-tube acting on said clutch lug, to restore the out of registry position of the clutch slot when the direction of movement of the propelling rod is reversed.

3. The structure of claim 2 wherein the two cam means are the lower and upper margins of a diagonal slot in a wall of the clutch tube into which the clutch lug is swung by the first named motion of revolution of the clutch tube caused by the first named cam.

4. The structure of claim 1 with a cam carried by the clutch tube in contact with the rod-lug during lead propelling motion and acting to assist the split-tube carried cam to cause rotation of the clutch tube to slot registering position.

5. A lead clutch for mechanical pencils comprising a tube having a clutch portion at one end and formed with a longitudinal slot in its wall; a portion of a wall of said tube at the remaining end obstructing said slot adjacent said end; a portion of the wall of the tube adjacent said obstructed slot end formed with a recess opening to said slot for reception of an actuating feed-lug; and a lug projecting from said tube adjacent its clutch end adapted to cause motion of revolution by contact with a cam surface carried by a split-tube.

6. The structure of claim 5 with the lower margin of said recess formed for cam action to assist in causing partial revolution of the clutch in use.

7. A lead feed nut for mechanical pencils comprising a wire helix to engage internal threads of a pencil barrel, the upper turn of the helix bent inwardly diametrically and then downwardly to provide a lead propelling rod; a plate member attached at one edge to said rod and at its opposite edge to a turn of said helix, positioned to stand in the slot of a split-tube of a pencil whereby to share with said diametrical extension of the helix in propulsive force of the split-tube upon the nut; and a lug formed integrally with and from the material of said rod, below said helix, to coact with a clutch of a pencil.

JOHN SHERMAN SMITH, Jr.

REFERENCES CITED

The following references are of record in the file of this patent:

UNITED STATES PATENTS

| Number | Name | Date |
|---|---|---|
| 1,496,763 | D'Olier | June 3, 1924 |
| 2,095,091 | Back | Oct. 5, 1937 |
| 2,129,655 | DeWitt | Sept. 13, 1938 |
| 2,534,091 | Weinberger | Dec. 12, 1950 |

FOREIGN PATENTS

| Number | Country | Date |
|---|---|---|
| 100,592 | Great Britain | May 29, 1917 |